(12) United States Patent
Han et al.

(10) Patent No.: US 11,488,284 B2
(45) Date of Patent: Nov. 1, 2022

(54) ELECTRONIC DEVICE AND METHOD FOR PROCESSING IMAGE

(71) Applicant: Samsung Electronics Co., Ltd., Suwon-si (KR)

(72) Inventors: Chunu Han, Suwon-si (KR); Junghoon Kim, Suwon-si (KR); Sangyoul Yoon, Suwon-si (KR); S M Zahid Ishraque, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 90 days.

(21) Appl. No.: 16/749,281

(22) Filed: Jan. 22, 2020

(65) Prior Publication Data

US 2020/0250795 A1    Aug. 6, 2020

(30) Foreign Application Priority Data

Jan. 31, 2019    (KR) ........................ 10-2019-0012772

(51) Int. Cl.
*G06T 5/00* (2006.01)
*G06T 5/50* (2006.01)
(Continued)

(52) U.S. Cl.
CPC ................ *G06T 5/002* (2013.01); *G06T 5/50* (2013.01); *G06V 10/22* (2022.01); *G06V 10/255* (2022.01); *G06V 10/751* (2022.01)

(58) Field of Classification Search
CPC .. G06K 9/2054; G06K 9/3241; G06K 9/6202; G06T 5/002; G06T 5/05; G06V 10/22; G06V 10/255; G06V 10/751
See application file for complete search history.

(56) References Cited

U.S. PATENT DOCUMENTS 9,710,885 B2      7/2017  Lee et al.
2004/0208388 A1*  10/2004 Schramm ................ G06T 5/002
                                               382/254
(Continued)

FOREIGN PATENT DOCUMENTS

JP    2005094452 A  *  4/2005
JP    2012-124798 A     6/2012
(Continued)

OTHER PUBLICATIONS

Li et al. ("Selectively Detail—Enhanced Fusion of Differently Exposed Images with Moving Objects," IEEE Transactions on Image Processing; vol. 23, Issue: 10, Oct. 2014) (Year: 2014).*

(Continued)

*Primary Examiner* — Yubin Hung
(74) *Attorney, Agent, or Firm* — Jefferson IP Law, LLP

(57)    ABSTRACT

A method for processing an image and an electronic device therefor are provided. The electronic device includes an image sensor, a memory, and a processor. The processor is configured to obtain a raw image using the image sensor, identify recognition information about a plurality of sub-regions corresponding to a plurality of objects included in the raw image, based on image recognition using the raw image, generate a first image by performing a first calibration process on the raw image using a first parameter set associated with first recognition information corresponding to a first sub-region among the plurality of sub-regions, generate a second image by performing a second calibration process on the raw image using a second parameter set associated with second recognition information corresponding to a second sub-region among the plurality of sub-regions, and generate a third image by using a region of the first image corresponding to the first sub-region and a region of the second image corresponding to the second sub-region.

20 Claims, 8 Drawing Sheets

(51) Int. Cl.
  *G06V 10/20* (2022.01)
  *G06V 10/22* (2022.01)
  *G06V 10/75* (2022.01)

(56) References Cited

U.S. PATENT DOCUMENTS

| | | | |
|---|---|---|---|
| 2010/0149420 A1 | 6/2010 | Zhang et al. | |
| 2011/0103707 A1* | 5/2011 | Tang | G06T 3/4053 |
| | | | 382/254 |
| 2012/0057045 A1 | 3/2012 | Shimizu | |
| 2013/0307766 A1* | 11/2013 | Amathnadu | G06F 3/017 |
| | | | 345/156 |
| 2014/0085296 A1* | 3/2014 | Baik | H04N 13/351 |
| | | | 345/419 |
| 2014/0153057 A1* | 6/2014 | Yaginuma | G06K 15/1825 |
| | | | 358/3.26 |
| 2014/0306999 A1 | 10/2014 | Yim et al. | |
| 2015/0109525 A1* | 4/2015 | Kimura | H04N 5/20 |
| | | | 348/370 |
| 2015/0138390 A1* | 5/2015 | Tomosada | H04N 5/232123 |
| | | | 348/222.1 |
| 2016/0050350 A1 | 2/2016 | Goel et al. | |
| 2016/0253129 A1 | 9/2016 | Achiwa | |
| 2017/0026600 A1 | 1/2017 | Noh et al. | |
| 2018/0033149 A1 | 2/2018 | Jeong et al. | |
| 2018/0357750 A1 | 12/2018 | Chen et al. | |
| 2019/0279345 A1 | 9/2019 | Kim et al. | |
| 2019/0378247 A1* | 12/2019 | Huang | G06T 5/002 |
| 2019/0394438 A1 | 12/2019 | Okamoto et al. | |
| 2020/0098145 A1 | 3/2020 | Seo et al. | |
| 2020/0145583 A1* | 5/2020 | Shanmugam | H04N 5/23218 |

FOREIGN PATENT DOCUMENTS

| | | |
|---|---|---|
| JP | 2015-142161 A | 8/2015 |
| KR | 10-2007-0027381 A | 3/2007 |
| KR | 10-2014-0122952 A | 10/2014 |
| KR | 10-2017-0012759 A | 2/2017 |
| KR | 10-2018-0051367 A | 5/2018 |
| KR | 10-2018-0067781 A | 6/2018 |
| KR | 10-2018-0108322 A | 10/2018 |

OTHER PUBLICATIONS

Lee ("Analysis of Raw Sensor Data with Applications in Image Processing and Compression," eScholarship, UC Open Access Publications, 2017. Available for download at https://escholarship.org/uc/item/4063t2j4) (Year: 2017).*
International Search Report and written opinion dated May 1, 2020, issued in an International Application No. PCT/KR2020/001115.
Extended European Search Report dated Apr. 12, 2022, issued in European Patent Application No. 20748367.8.
Partial Supplementary European Search Report dated Dec. 3, 2021, issued in European Patent Application No. 20748367.8.

* cited by examiner

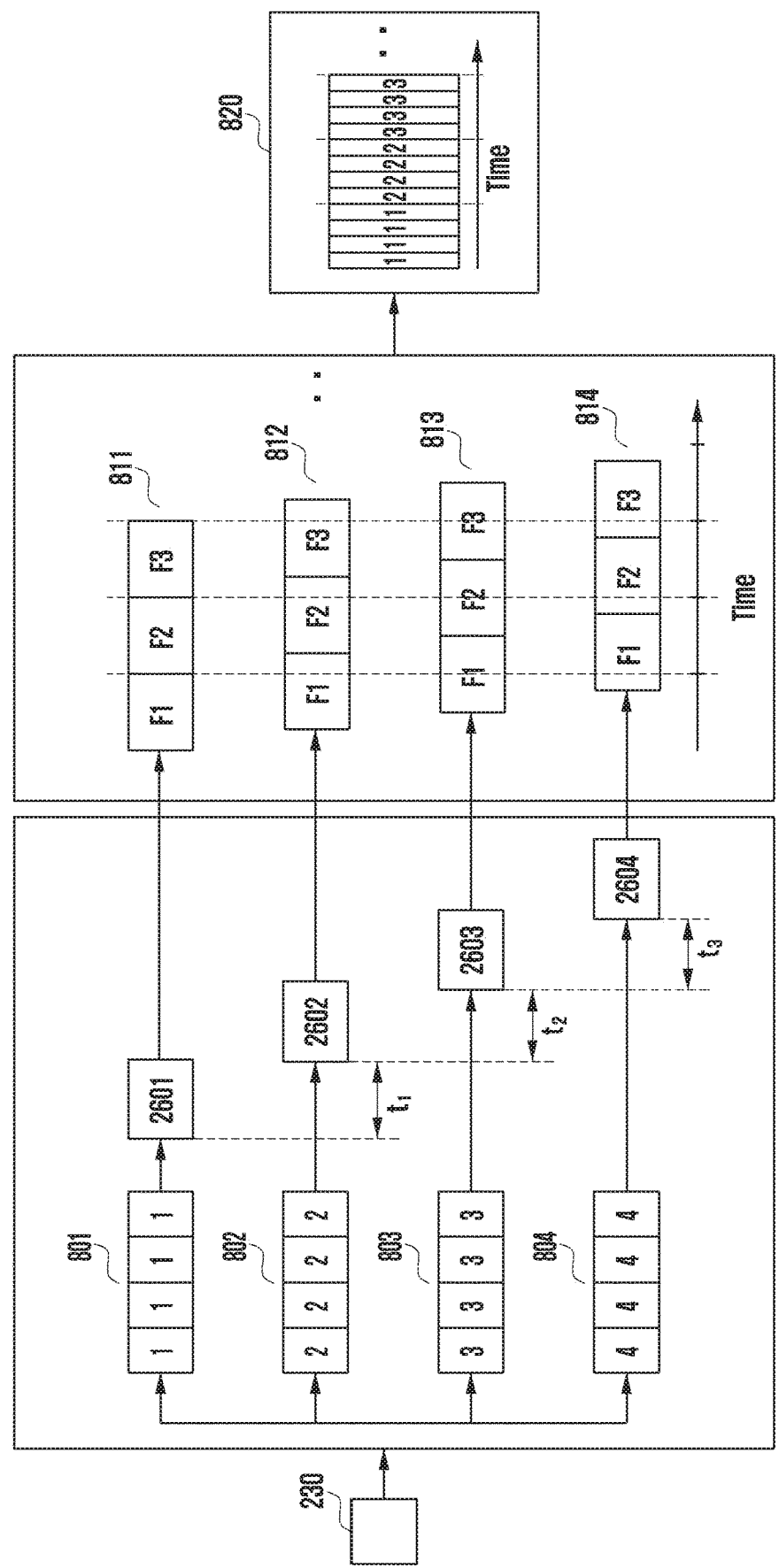

ELECTRONIC DEVICE AND METHOD FOR PROCESSING IMAGE

CROSS-REFERENCE TO RELATED APPLICATION(S)

This application is based on and claims priority under 35 U.S.C. § 119 of a Korean patent application number 10-2019-0012772, filed on Jan. 31, 2019, in the Korean Intellectual Property Office, the disclosure of which is incorporated by reference herein in its entirety.

BACKGROUND

1. Field

The disclosure relates to a method for processing an image and an electronic device including the method.

2. Description of Related Art

Various electronic devices, such as a smartphone, a tablet personal computer (PC), a portable multimedia player (PMP), a personal digital assistant (PDA), a laptop PC, and a wearable device including a wrist watch and a head-mounted display (HMD), includes a camera and may capture an image using the camera.

The above information is presented as background information only to assist with an understanding of the disclosure. No determination has been made, and no assertion is made, as to whether any of the above might be applicable as prior art with regard to the disclosure.

SUMMARY

Generally, when processing a captured image, an electronic device may detect, process, and display a single object representing a scene from the captured image. Since the image is processed with respect to the object representing the scene, image processing on other objects is ineffective.

To process not only an object representing a scene but also other objects, a technique in which individual objects are separated from an image, are subjected to image processing, and are composed may be used. This technique is a post-image processing method and involves performing image processing a plurality of times in order to apply a plurality of image processing effects for a plurality of objects, thus causing a problem with processing speed.

Aspects of the disclosure are to address at least the above-mentioned problems and/or disadvantages and to provide at least the advantages described below. Accordingly, an aspect of the disclosure is to provide an apparatus and method for an electronic device and an image processing method of an electronic device. According to various embodiments, the device may perform image processing with respect to various objects included in an image in parallel.

Additional aspects will be set forth in part in the description which follows and, in part, will be apparent from the description, or may be learned by practice of the presented embodiments.

An electronic device and an image processing method of an electronic device according to various embodiments may perform image processing by pixels of an image sensor in parallel.

In accordance with an aspect of the disclosure, an electronic device is provided. The electronic device includes an image sensor, a memory, and at least one processor configured to obtain a raw image using the image sensor, identify recognition information about a plurality of sub-regions corresponding to a plurality of objects included in the raw image, based on image recognition using the raw image, generate a first image by performing a first calibration process on the raw image using a first parameter set associated with first recognition information corresponding to a first sub-region among the plurality of sub-regions, generate a second image by performing a second calibration process on the raw image using a second parameter set associated with second recognition information corresponding to a second sub-region among the plurality of sub-regions, and generate a third image by using a region of the first image corresponding to the first sub-region and a region of the second image corresponding to the second sub-region.

In accordance with another aspect of the disclosure, an image processing method of an electronic device including an image sensor is provided. The image processing method includes obtaining a raw image using the image sensor, identifying recognition information about a plurality of sub-regions corresponding to a plurality of objects included in the raw image, based on image recognition using the raw image, generating a first image by performing a first calibration process on the raw image using a first parameter set associated with first recognition information corresponding to a first sub-region among the plurality of sub-regions, generating a second image by performing a second calibration process on the raw image using a second parameter set associated with second recognition information corresponding to a second sub-region among the plurality of sub-regions, and generating a third image by using a region of the first image corresponding to the first sub-region and a region of the second image corresponding to the second sub-region.

An electronic device and an image processing method of an electronic device according to various embodiments may perform image processing with respect to various objects included in an image in parallel, thereby providing an image with an improved quality for a user.

An electronic device and an image processing method of an electronic device according to various embodiments may perform image processing with respect to various objects included in an image in parallel, thereby providing a quickly processed image for a user.

An electronic device and an image processing method of an electronic device according to various embodiments may perform image processing by pixels of an image sensor in parallel, thereby providing an image with an improved quality for a user.

An electronic device and an image processing method of an electronic device according to various embodiments may perform image processing by pixels of an image sensor in parallel, thereby providing a quickly processed image for a user.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 8 illustrates the method in which the electronic device processes the image per pixel disclosed in FIG. 7 according to an embodiment of the disclosure.

Throughout the drawings, like reference numerals will be understood to refer to like parts, components, and structures

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
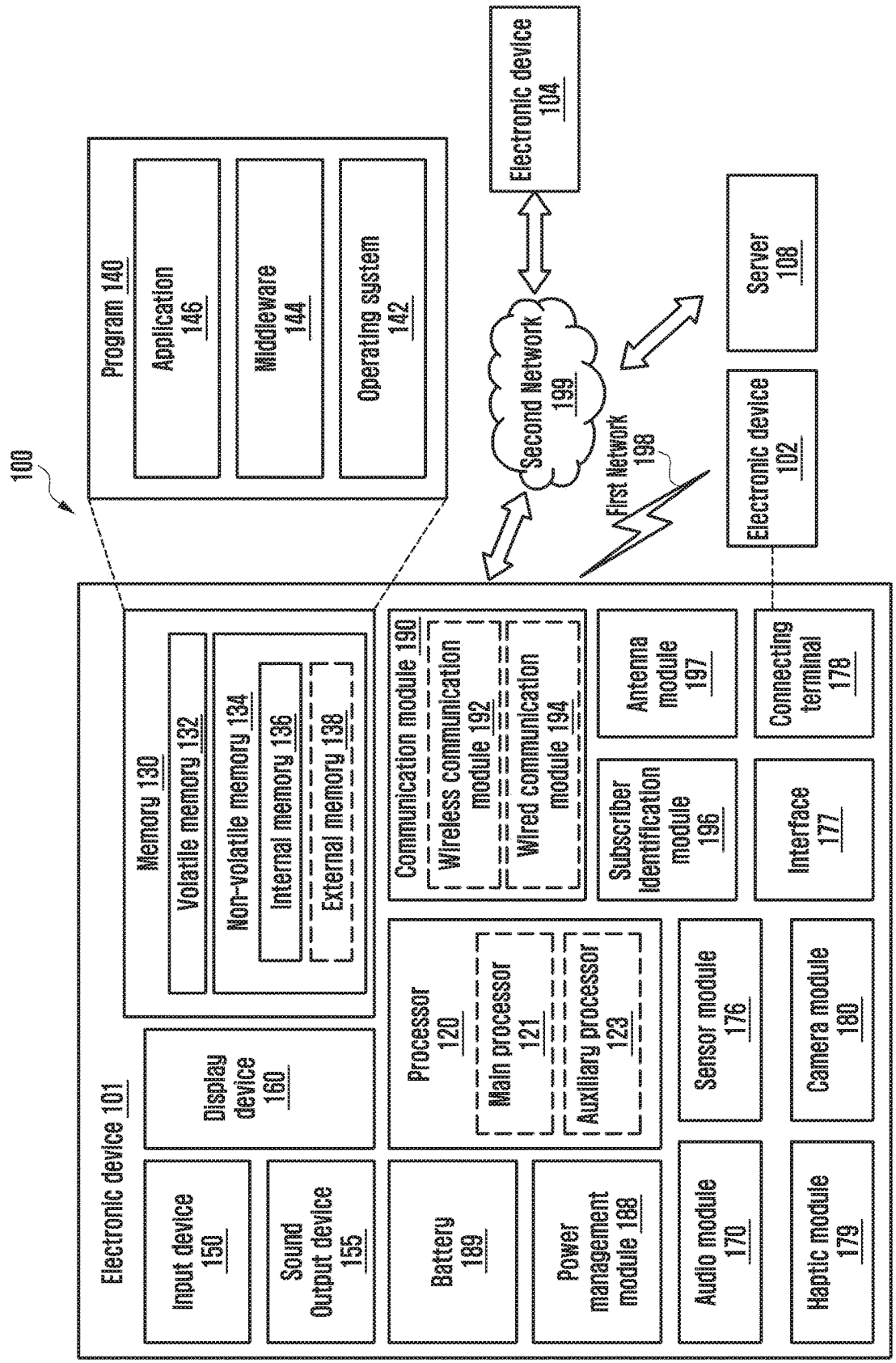
FIG. 1 is a block diagram illustrating an electronic device in a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., printed circuit board (PCB)). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
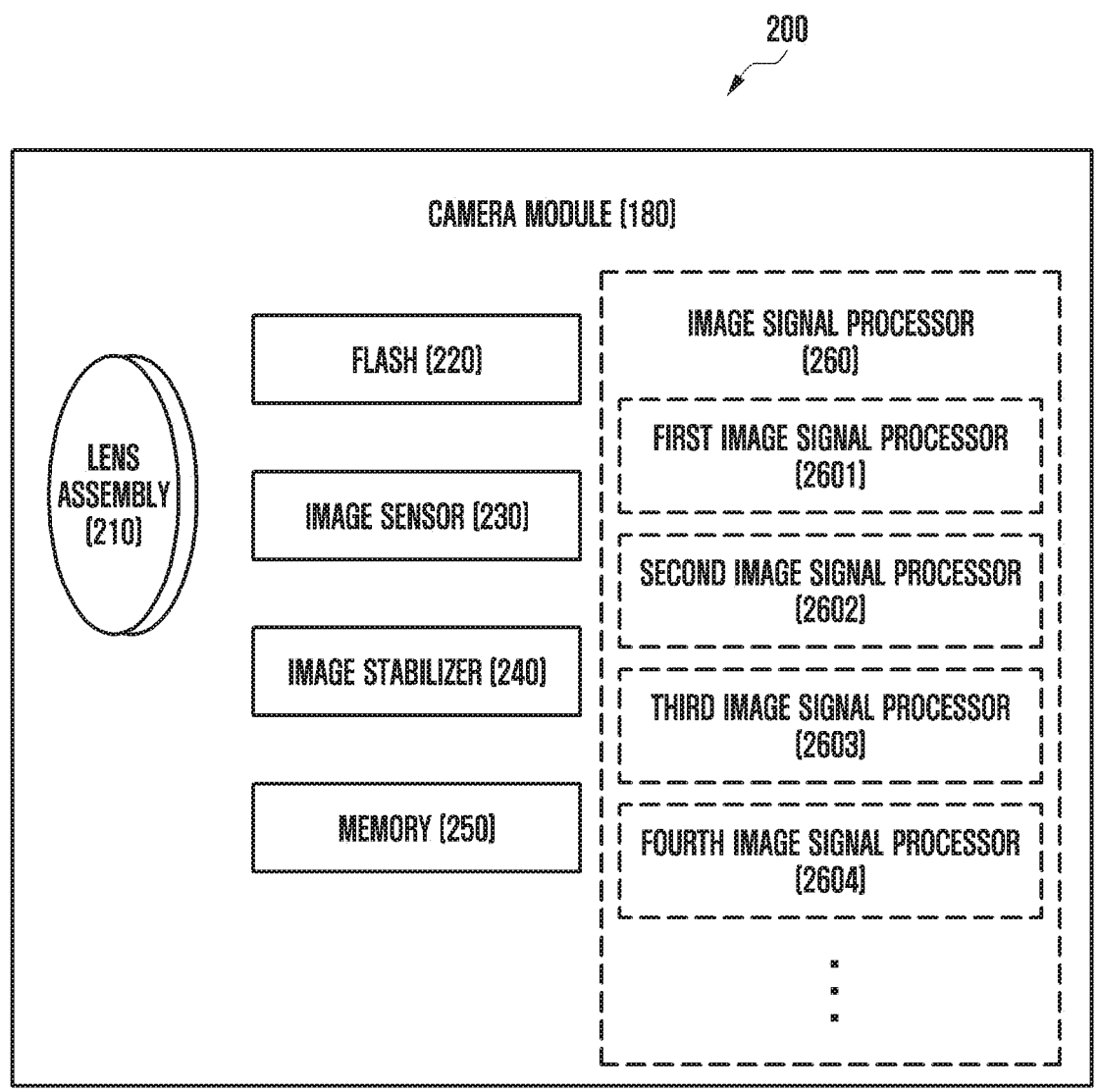
FIG. 2 is a block diagram illustrating a camera module according to an embodiment of the disclosure.

FIG. 2 is a block diagram 200 illustrating the camera module 180 according to an embodiment of the disclosure.

Referring to FIG. 2, the camera module 180 may include a lens assembly 210, a flash 220, an image sensor 230, an image stabilizer 240, memory 250 (e.g., buffer memory), or an image signal processor 260. The lens assembly 210 may collect light emitted or reflected from an object whose image is to be taken. The lens assembly 210 may include one or more lenses. According to an embodiment, the camera module 180 may include a plurality of lens assemblies 210. In such a case, the camera module 180 may form, for example, a dual camera, a 360-degree camera, or a spherical camera. Some of the plurality of lens assemblies 210 may have the same lens attribute (e.g., view angle, focal length, auto-focusing, f number, or optical zoom), or at least one lens assembly may have one or more lens attributes different from those of another lens assembly. The lens assembly 210 may include, for example, a wide-angle lens or a telephoto lens.

The flash 220 may emit light that is used to reinforce light reflected from an object. According to an embodiment, the flash 220 may include one or more light emitting diodes (LEDs) (e.g., a red-green-blue (RGB) LED, a white LED, an infrared (IR) LED, or an ultraviolet (UV) LED) or a xenon lamp. The image sensor 230 may obtain an image corresponding to an object by converting light emitted or reflected from the object and transmitted via the lens assembly 210 into an electrical signal. According to an embodiment, the image sensor 230 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using, for example, a charged coupled device (CCD) sensor or a complementary metal oxide semiconductor (CMOS) sensor.

The image stabilizer 240 may move the image sensor 230 or at least one lens included in the lens assembly 210 in a particular direction, or control an operational attribute (e.g., adjust the read-out timing) of the image sensor 230 in response to the movement of the camera module 180 or the electronic device 101 including the camera module 180. This allows compensating for at least part of a negative effect (e.g., image blurring) by the movement on an image being captured. According to an embodiment, the image stabilizer 240 may sense such a movement by the camera module 180 or the electronic device 101 using a gyro sensor (not shown) or an acceleration sensor (not shown) disposed inside or outside the camera module 180. According to an embodiment, the image stabilizer 240 may be implemented, for example, as an optical image stabilizer.

The memory 250 may store, at least temporarily, at least part of an image obtained via the image sensor 230 for a subsequent image processing task. For example, if image capturing is delayed due to shutter lag or multiple images are quickly captured, a raw image obtained (e.g., a Bayer-patterned image, a high-resolution image) may be stored in the memory 250, and its corresponding copy image (e.g., a low-resolution image) may be previewed via the display device 160. Thereafter, if a specified condition is met (e.g., by a user's input or system command), at least part of the raw image stored in the memory 250 may be obtained and processed, for example, by the image signal processor 260. According to an embodiment, the memory 250 may be configured as at least part of the memory 130 or as a separate memory that is operated independently from the memory 130.

The image signal processor 260 may perform one or more image processing with respect to an image obtained via the image sensor 230 or an image stored in the memory 250. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 260 may perform control (e.g., exposure time control or read-out timing control) with respect to at least one (e.g., the image sensor 230) of the components included in the camera module 180. An image processed by the image signal processor 260 may be stored back in the memory 250 for further processing, or may be provided to an external component (e.g., the memory 130, the display device 160, the electronic device 102, the electronic device 104, or the server 108) outside the camera module 180. According to an embodiment, the image signal processor 260 may be configured as at least part of the processor 120, or as a separate processor that is operated independently from the processor 120. If the image signal processor 260 is configured as a separate processor from the processor 120, at least one image processed by the image signal processor 260 may be displayed, by the processor 120, via the display device 160 as it is or after being further processed.

An image signal processor 260 may include at least one processor. The image signal processor 260 may include at least one image signal processor 2601, 2602, 2603, or 2604.

According to an embodiment, the electronic device 101 may include a plurality of camera modules 180 having different attributes or functions. In such a case, at least one of the plurality of camera modules 180 may form, for example, a wide-angle camera and at least another of the plurality of camera modules 180 may form a telephoto camera. Similarly, at least one of the plurality of camera modules 180 may form, for example, a front camera and at least another of the plurality of camera modules 180 may form a rear camera.

Figure 3:
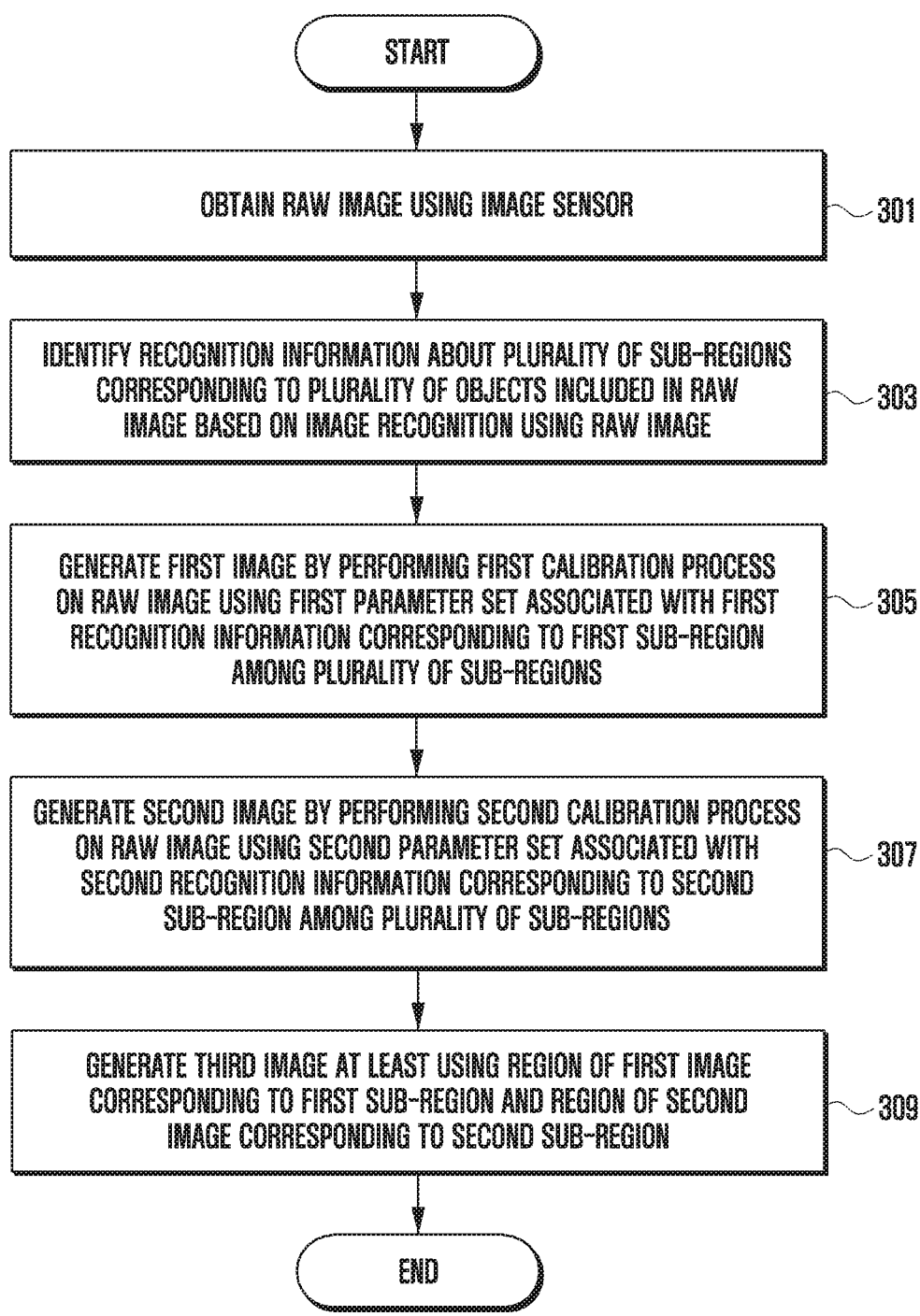
FIG. 3 illustrates a method in which an electronic device processes an image per object according to an embodiment of the disclosure.

FIG. 3 illustrates a method in which an electronic device 101 processes an image per object according to an embodiment of the disclosure.

Referring to FIG. 3, in operation 301, the electronic device 101 may obtain a raw image using an image sensor 230 of a camera module 180 under the control of a processor 120. The raw image may include at least one object.

In operation 303, the electronic device 101 may identify recognition information about a plurality of sub-regions corresponding to a plurality of objects included in the raw image based on image recognition using the raw image under the control of the processor 120.

The electronic device 101 may recognize an object included in the raw image using a recognition module. For example, the image may include various objects, such as a person, a sky, a flower, or a letter, and the electronic device 101 may recognize a region corresponding to an object included in the image using the recognition module and may identify recognition information.

The electronic device 101 may store the recognition module in a memory 130 as a logical module executable in the processor 120. The electronic device 101 may embed the recognition module in the processor 120.

The recognition module may be a logical module and may be configured as a processor (e.g., the processor 120) in an external electronic device. The recognition module may analyze various pieces of significant information (e.g., object recognition, a velocity vector, face recognition, segmentation, scene parsing, or the like) from an image (e.g., a raw image, a small raw image, an image file, or the like). To this end, the recognition module may include various algorithms. The recognition module may generate, store, or transmit information (recipe information, e.g., information including a segment, a layer, a vector, or a scene category) for an image signal processor 260 to use for various types of image processing as the analysis result in association with the image.

The electronic device 101 may prioritize the plurality of objects included in the raw image using the recognition module and may perform a calibration process only on an object within preset priorities.

For example, the preset priorities may correspond to the number of image signal processors 260. The electronic device 101 may include first to fourth image signal processors 2601, 2602, 2603, and 2604 and may perform a calibration process on objects within four priorities corresponding to the four image signal processors.

For example, when the raw image includes various objects, such as a lawn, a person, a car, a letter, a natural object, or a sky, the electronic device 101 may prioritize the plurality of objects and may perform a calibration process on objects within the preset priorities.

In operation 305, the electronic device 101 may generate a first image by performing a first calibration process on the raw image using a first parameter set associated with first recognition information corresponding to a first sub-region among the plurality of sub-regions under the control of the image signal processor 260 or the processor 120.

The image signal processor 260 may calibrate an image using at least one of original color mapping, detail re-generation, text reconstruction, image inpainting, scene-based white balance (WB)/color adjustment, segmentation-based noise reduction (NR)/sharpening, or segmentation-based detail enhancement.

The plurality of sub-regions may correspond to the plurality of objects included in the raw image. The first sub-region may correspond to one object (e.g., a first object) among the plurality of objects included in the raw image. The first recognition information may be significant information obtained by identifying the first object through the recognition module (e.g., information obtained by recognizing the first object as an object or a face).

The first parameter set may include at least one image processing parameter among original color mapping, detail re-generation, text reconstruction, image inpainting, scene-based white balance (WB)/color adjustment, segmentation-based noise reduction (NR)/sharpening, or segmentation-based detail enhancement parameters.

According to various embodiments, in operation 305, the electronic device 101 may generate the first image by performing the first calibration process on the raw image using the first parameter set associated with the first recognition information corresponding to the first sub-region among the plurality of sub-regions through the first image signal processor 2601 under the control of the image signal processor 260 or the processor 120.

In operation 307, the electronic device 101 may generate a second image by performing a second calibration process on the raw image using a second parameter set associated with second recognition information corresponding to a second sub-region among the plurality of sub-regions under the control of the image signal processor 260 or the processor 120.

The second sub-region may correspond to one object (e.g., a second object) among the plurality of objects included in the raw image. The second recognition information may be significant information obtained by identifying the second object through the recognition module (e.g., information obtained by recognizing the second object as an object or a face).

The second parameter set may include at least one image processing parameter among original color mapping, detail re-generation, text reconstruction, image inpainting, scene-based white balance (WB)/color adjustment, segmentation-based noise reduction (NR)/sharpening, or segmentation-based detail enhancement parameters.

According to various embodiments, in operation 307, the electronic device 101 may generate a second image by performing the second calibration process on the raw image using the second parameter set associated with the second recognition information corresponding to the second sub-region among the plurality of sub-regions through the second image signal processor 2602 under the control of the image signal processor 260 or the processor 120.

The electronic device 101 may generate the first image by performing the first image calibration process on the raw image using one of the plurality of image signal processors and may generate the second image by performing the second image calibration process on the raw image using another one of the plurality of image signal processors. For example, the electronic device 101 may generate the first image and the second image at the same time or in parallel using the first image signal processor 2601 and the second image signal processor 2602.

In various embodiments, the electronic device 101 may perform operation 305 and operation 307 at the same time or in parallel using the first image signal processor 2601 and the second image signal processor 2602.

In operation 309, the electronic device 101 may generate a third image at least using a region of the first image corresponding to the first sub-region and a region of the second image corresponding to the second sub-region under the control of the image signal processor 260 or the processor 120.

According to various embodiments, when the first image is generated in operation 305, the electronic device 101 may perform an image calibration process with respect to the recognized first object. When the second image is generated in operation 307, the electronic device 101 may perform an image calibration process with respect to the recognized second object. In operation 309, the electronic device 101 may extract a sub-region calibrated with respect to the first object from the first image, may extract a sub-region calibrated with respect to the second object from the second image, and may compose the extracted sub-regions, thereby generating the third image.

Figure 4:
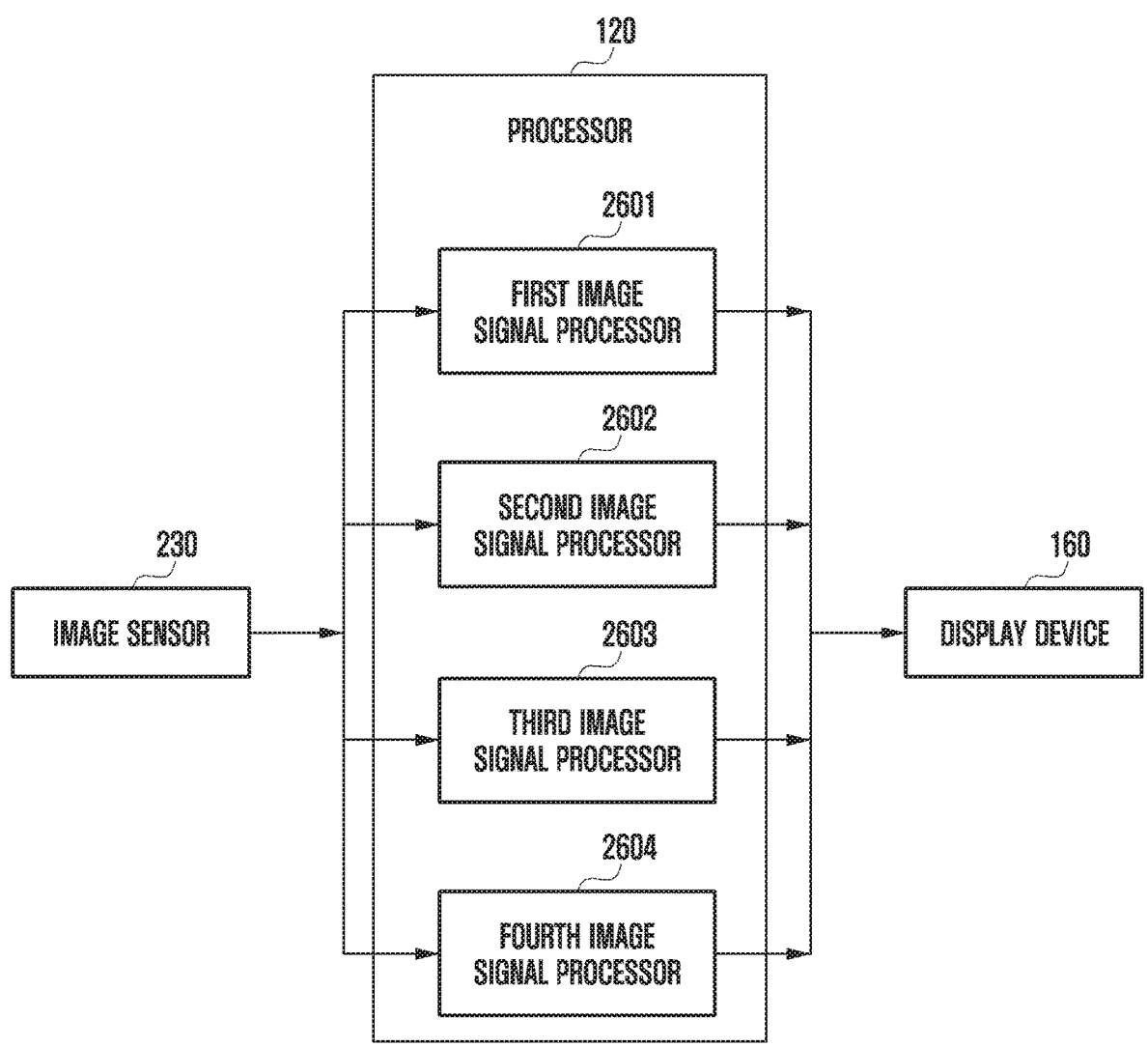
FIG. 4 is a flow diagram illustrating the method of FIG. 3 as performed by components of an electronic device according to various embodiments of the disclosure.

FIG. 4 is a flow diagram illustrating the method of FIG. 3 as performed by components of an electronic device according to an embodiment of the disclosure.

The electronic device 101 may obtain a raw image using an image sensor 230 of a camera module 180. The raw image may include at least one object.

The electronic device 101 may transmit the raw image from the image sensor 230 to a processor 120. The processor 120 may identify recognition information about a plurality of sub-regions corresponding to a plurality of objects included in the raw image based on image recognition using a recognition module. The processor 120 may include first to fourth image signal processors 2601, 2602, 2603, and 2604.

The electronic device 101 may recognize an object included in the raw image using the recognition module of the processor 120. For example, the raw image may include various objects, such as a person, a sky, a flower, or a letter, and the electronic device 101 may recognize a region corresponding to an object included in the image using the recognition module and may identify recognition information.

The electronic device 101 may prioritize the plurality of objects included in the raw image using the recognition module of the processor 120 and may perform a calibration process only on an object within preset priorities.

For example, the preset priorities may correspond to the number of image signal processors 260. The electronic device 101 may include the first to fourth image signal processors 2601, 2602, 2603, and 2604 and may perform a calibration process on objects within four priorities corresponding to the four image signal processors.

For example, when the raw image includes various objects, such as a lawn, a person, a car, a letter, a natural object, or a sky, the electronic device 101 may prioritize the plurality of objects and may perform a calibration process on objects within the preset priorities.

For example, when four objects including a lawn, a person, a car, and a letter corresponding to the first to fourth image signal processors 2601, 2602, 2603, and 2604 are selected as the objects within the priorities, the first to fourth image signal processors 2601, 2602, 2603, and 2604 may calibrate the image with respect to the selected objects, respectively. Specifically, the first image signal processor 2601 may generate a first image by generating and calibrating an image with respect to the person. The second image signal processor 2602 may generate a second image by generating and calibrating an image with respect to the lawn. The third image signal processor 2603 may generate a third image by generating and calibrating an image with respect to the car. The fourth image signal processor 2604 may generate a fourth image by generating and calibrating an image with respect to the letter.

The electronic device 101 may extract sub-regions from the first to fourth calibrated images, may compose the sub-regions, and may display a composed image on a display device 160.

Figure 5:
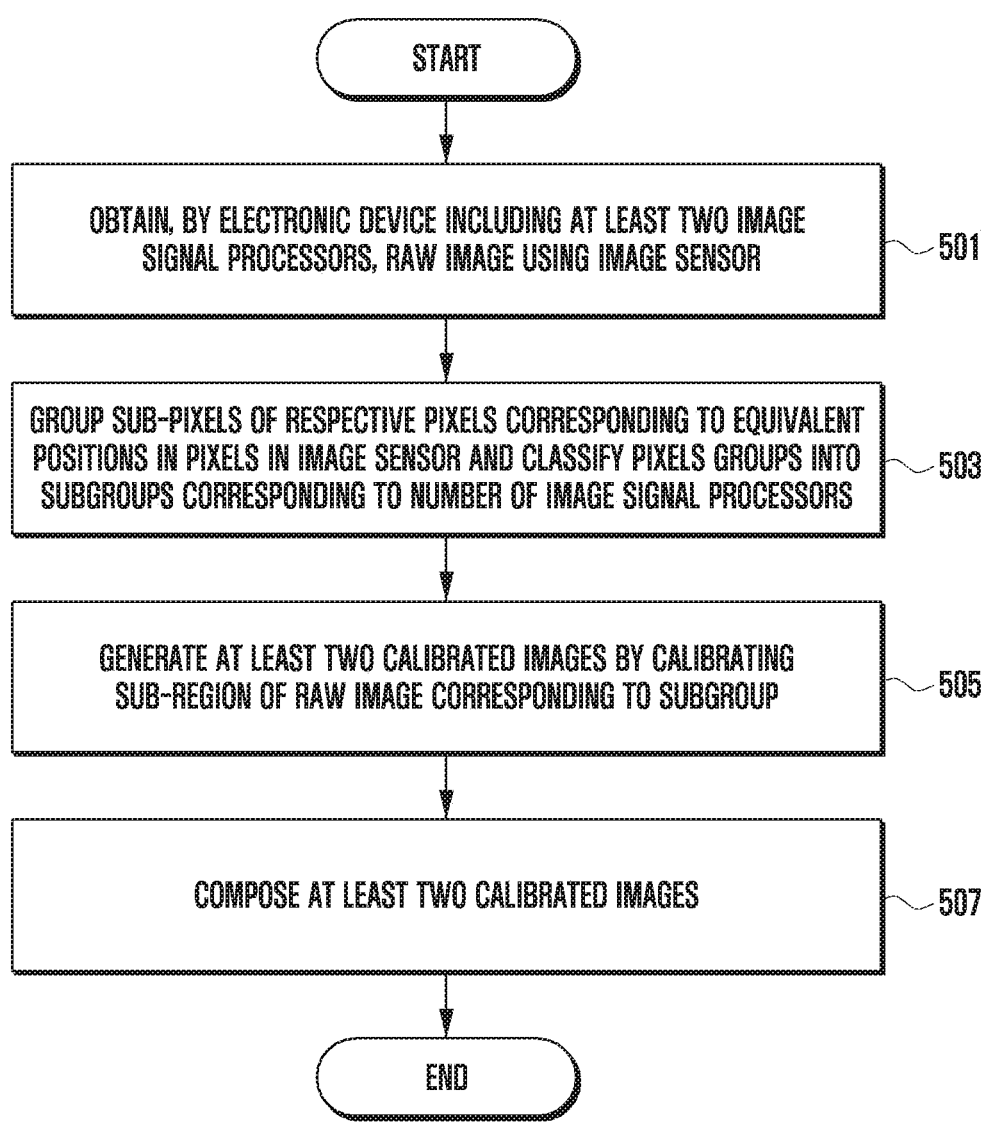
FIG. 5 illustrates a method in which an electronic device processes an image per pixel according to an embodiment of the disclosure.

FIG. 5 illustrates a method in which an electronic device 101 processes an image per pixel according to an embodiment of the disclosure.

The electronic device 101 may obtain a raw image using an image sensor 230 of a camera module 180. The raw image may include at least one object.

The electronic device 101 may transmit the raw image from the image sensor 230 to a processor 120. The processor 120 may identify recognition information about a plurality of sub-regions corresponding to a plurality of objects included in the raw image based on image recognition using a recognition module. The processor 120 may include first to fourth image signal processors 2601, 2602, 2603, and 2604.

The electronic device 101 may recognize an object included in the raw image using the recognition module of the processor 120. For example, the raw image may include various objects, such as a person, a sky, a flower, or a letter, and the electronic device 101 may recognize a region corresponding to an object included in the image using the recognition module and may identify recognition information.

The electronic device 101 may prioritize the plurality of objects included in the raw image using the recognition module of the processor 120 and may perform a calibration process only on an object within preset priorities.

In operation 501, the electronic device 101, which includes at least two image signal processors, may obtain a raw image using the image sensor 230 under the control of the processor 120.

In operation 503, the electronic device 101 may group sub-pixels of respective pixels corresponding to equivalent positions in the pixels in the image sensor 230 and may classify groups of sub-pixels into subgroups corresponding to the number of image signal processors (e.g., 260, 2601, 2602, 2603, and 2604) included in the electronic device 101 under the control of the processor 120. The image sensor 230 may be an image sensor in which a pixel corresponding to one channel (e.g., one color filter R, G, or B) is divided into a plurality of (or multiple) sub-pixels. For example, when a pixel corresponding to one channel (e.g., one color filter R, G, or B) includes two sub-pixels, the image sensor 230 may be referred to as a 2 photodiode (2PD) or a dual PD; when the pixel includes four sub-pixels, the image sensor 230 may be referred to as a 4PD, a quadra-sensor, or a tetra-sensor. Further, in the image sensor 230, sub-pixels may share a microlens, or each sub-pixel may have a microlens.

In various embodiments, the image sensor 230 may be an image sensor in which a pixel corresponding to one channel (e.g., one color filter R, G, or B) is divided into two sub-pixels.

In various embodiments, the image sensor 230 may be an image sensor in which a pixel corresponding to one channel (e.g., one color filter R, G, or B) is divided into four sub-pixels.

For example, the image sensor 230 may include color filters in various arrays (e.g., a Bayer array). A color filter may include a plurality of pixels. The electronic device 101 may group pixels corresponding to one of the color filters (or channels) by sub-pixels of respective pixels corresponding to equivalent positions in the pixels and may classify groups of sub-pixels into subgroups corresponding to the number of image signal processors (e.g., 260, 2601, 2602, 2603, and 2604) included in the electronic device 101.

For example, the image sensor 230 including a color filter may include red, green, and blue color filters. Each of the red, green, and blue color filters may include a plurality of pixels. The electronic device 101 may group pixels corresponding to one of the color filters (channels) by sub-pixels of respective pixels corresponding to equivalent positions in the pixels and may classify sub-pixels into subgroups corresponding to the number of image signal processors (e.g., 260, 2601, 2602, 2603, and 2604). Specifically, when the electronic device 101 includes four image signal processors, the groups of sub-pixels may be classified into four subgroups. When the electronic device 101 includes two image signal processors, the groups of sub-pixels may be classified into two subgroups.

In operation 505, the electronic device 101 may generate at least two calibrated images by calibrating a sub-region of the raw image corresponding to the subgroups under the control of the image signal processor 260 or the processor 120.

In operation 507, the electronic device 101 may compose the at least two calibrated images under the control of the image signal processor 260 or the processor 120.

Figure 6:
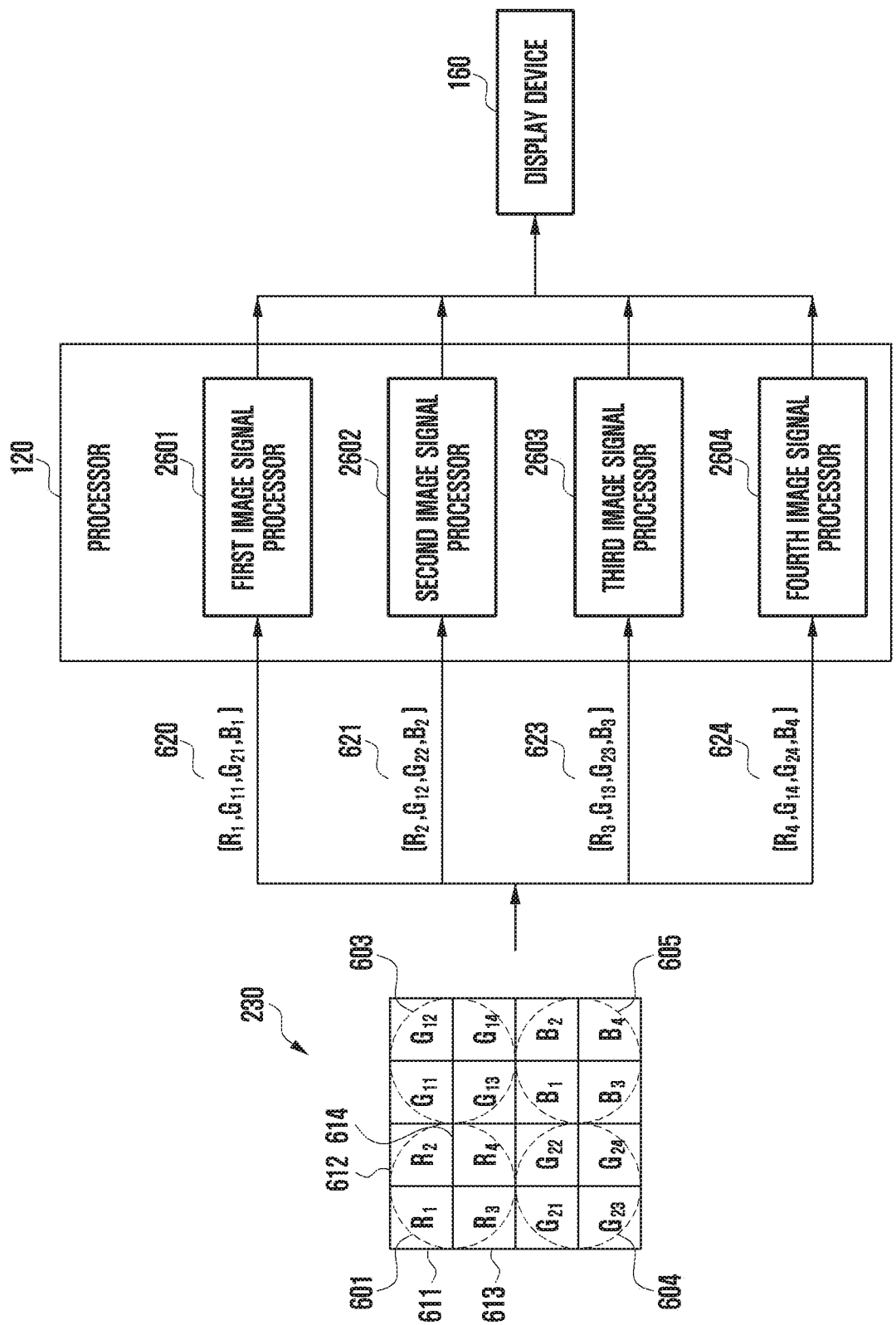
FIG. 6 illustrates the method in which the electronic device processes the image per pixel disclosed in FIG. 5 according to an embodiment of the disclosure.

FIG. 6 illustrates the method in which the electronic device 101 processes the image per pixel disclosure in FIG. 5 according to an embodiment of the disclosure.

The electronic device 101, which includes at least two image signal processors, may obtain a raw image using an image sensor 230. The image sensor 230 illustrated in FIG. 6 may be an image sensor in which a pixel corresponding to one channel (e.g., one color filter R, G, or B) is divided into a plurality of (or multiple) sub-pixels.

In the image sensor 230, one array may include one red color filter 601 two green color filters 603 and 604, one blue color filter 605, and each color filter may include four pixels (or sensor cells, e.g., 611, 612, 613, and 614).

The electronic device 101 may group the pixels corresponding to one of the color filters (or channels) in the image sensor 230 by sub-pixels of respective pixels corresponding to equivalent positions in the pixels and may classify groups of sub-pixels into four subgroups corresponding to the number of first to four image signal processors 2601, 2602, 2603, and 2604 included in the electronic device 101 under the control of the processor 120.

The electronic device 101 may transmit an image of the obtained raw image corresponding to a first subgroup (R1, G11, G21, and B1) 620 from the image sensor 230 to the first image signal processor 2601. The first image signal processor 2601 may process the image of the raw image corresponding to the first sub-group (R1, G11, G21, and B1) 620.

The electronic device 101 may transmit an image of the obtained raw image corresponding to a second subgroup (R2, G12, G22, and B2) 621 from the image sensor 230 to the second image signal processor 2602. The second image signal processor 2602 may process the image of the raw image corresponding to the second subgroup (R2, G12, G22, and B2) 621.

The electronic device 101 may transmit an image of the obtained raw image corresponding to a third subgroup (R3, G13, G23, and B3) 623 from the image sensor 230 to the third image signal processor 2603. The third image signal processor 2603 may process the image of the raw image corresponding to the third subgroup (R3, G13, G23, and B3) 623.

The electronic device 101 may transmit an image of the obtained raw image corresponding to a fourth subgroup (R4, G14, G24, and B4) 624 from the image sensor 230 to the fourth image signal processor 2604. The fourth image signal processor 2604 may process the image of the raw image corresponding to the fourth subgroup (R4, G14, G24, and B4) 624.

The electronic device 101 may compose at least two calibrated images under the control of the image signal processor 260 or the processor 120. The electronic device 101 may display a composed image on a display device 160.

Figure 7:
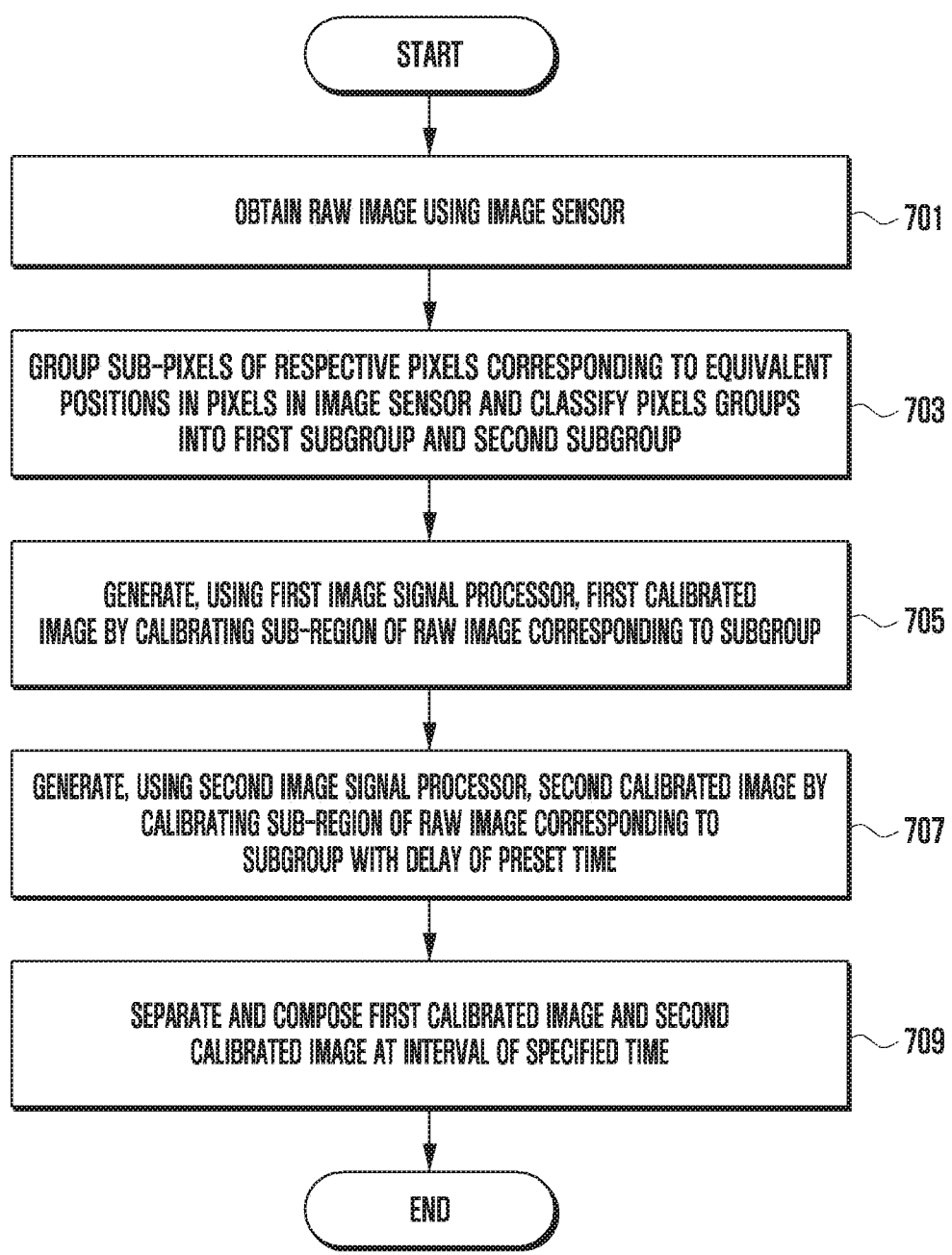
FIG. 7 illustrates a method in which an electronic device processes an image per pixel according to an embodiment of the disclosure.

FIG. 7 illustrates a method in which an electronic device 101 processes an image per pixel according to an embodiment of the disclosure.

Referring to FIG. 7, in operation 701, the electronic device 101, which includes at least two image signal processors, may obtain a raw image using an image sensor 230 under the control of a processor 120.

In operation 703, the electronic device 101 may group sub-pixels of respective pixels corresponding to equivalent positions in the pixels in the image sensor 230 and may classify groups of sub-pixels into a first subgroup corresponding to a first image signal processor 2601 and a second subgroup corresponding to a second image signal processor 2602 under the control of the processor 120. The image sensor 230 may be an image sensor in which a pixel corresponding to one channel (e.g., one color filter R, G, or B) is divided into a plurality of (or multiple) sub-pixels. For example, when a pixel corresponding to one channel (e.g., one color filter R, G, or B) includes two sub-pixels, the image sensor 230 may be referred to as a 2PD or a dual PD; when the pixel includes four sub-pixels, the image sensor 230 may be referred to as a 4PD, a quadra-sensor, or a tetra-sensor. Further, in the image sensor 230, sub-pixels may share a microlens, or each sub-pixel may have a microlens.

In various embodiments, the image sensor 230 may be an image sensor in which a pixel corresponding to one channel (e.g., one color filter R, G, or B) is divided into two sub-pixels.

In various embodiments, the image sensor 230 may be an image sensor in which a pixel corresponding to one channel (e.g., one color filter R, G, or B) is divided into four sub-pixels.

For example, the image sensor 230 may include color filters in various arrays (e.g., a Bayer array). A color filter may include a plurality of pixels. The electronic device 101 may group pixels corresponding to one of the color filters (or channels) by sub-pixels of respective pixels corresponding to equivalent positions in the pixels and may classify groups of sub-pixels into subgroups corresponding to the number of image signal processors (e.g., 260, 2601, 2602, 2603, and 2604) included in the electronic device 101.

For example, the image sensor 230 including a color filter may include red, green, and blue color filters. Each of the red, green, and blue color filters may include a plurality of pixels. The electronic device 101 may group pixels corresponding to one of the color filters (channels) by sub-pixels of respective pixels corresponding to equivalent positions in the pixels and may classify sub-pixels into subgroups corresponding to the number of image signal processors (e.g., 260, 2601, 2602, 2603, and 2604). Specifically, when the electronic device 101 includes four image signal processors, the groups of sub-pixels may be classified into four subgroups. When the electronic device 101 includes two image signal processors, the groups of sub-pixels may be classified into two subgroups.

In operation 705, in the electronic device 101, the first image signal processor 2601 may receive a sub-region of the raw image corresponding to the first subgroup from the image sensor and may generate a first calibrated image by calibrating the sub-region of the raw image corresponding to the first subgroup under the control of an image signal processor 260 or the processor 120.

In operation 707, in the electronic device 101, the second image signal processor 2602 may receive a sub-region of the raw image corresponding to the second subgroup from the image sensor and may generate a second calibrated image by calibrating the sub-region of the raw image corresponding to the second subgroup with a delay of a preset time after the first image signal processor 2601 receives the sub-region of the raw image corresponding to the first subgroup from the image sensor under the control of an image signal processor 260 or the processor 120.

In operation 709, the electronic device 101 may generate an image by separating the first calibrated image and the second calibrated image at an interval of a specified time and composing the same under the control of the image signal processor 260 or the processor 120.

FIG. 8 illustrates the method in which the electronic device 101 processes the image per pixel disclosure in FIG. 7 according to an embodiment of the disclosure.

The electronic device 101, which includes at least two image signal processors, may obtain a raw image using an image sensor 230.

The electronic device 101 may group sub-pixels of respective pixels corresponding to equivalent positions in the pixels in the image sensor 230 and may classify groups of sub-pixels into a first subgroup corresponding to a first image signal processor 2601, a second subgroup corresponding to a second image signal processor 2602, a third subgroup corresponding to a third image signal processor 2603, and a fourth subgroup corresponding to a fourth image signal processor 2604.

For example, the image sensor 230 may include color filters in various arrays (e.g., a Bayer array or a tetra-array). A color filter may include a plurality of pixels. The electronic device 101 may group pixels corresponding to one of the color filters (or channels) by sub-pixels of respective pixels corresponding to equivalent positions in the pixels and may classify groups of sub-pixels into subgroups corresponding to the number of image signal processors (e.g., 260, 2601, 2602, 2603, and 2604) included in the electronic device 101.

For example, the image sensor 230 including a color filter may include red, green, and blue color filters. Each of the red, green, and blue color filters may include a plurality of pixels. The electronic device 101 may group pixels corresponding to one of the color filters (channels) by sub-pixels of respective pixels corresponding to equivalent positions in the pixels and may classify sub-pixels into subgroups corresponding to the number of image signal processors (e.g., 260, 2601, 2602, 2603, and 2604). Specifically, when the electronic device 101 includes four image signal processors, the groups of sub-pixels may be classified into four subgroups. When the electronic device 101 includes two image signal processors, the groups of sub-pixels may be classified into two subgroups.

In the electronic device 101, the first image signal processor 2601 may receive a sub-region 801 of the raw image corresponding to the first subgroup from the image sensor 230 and may generate a first calibrated image 811 by calibrating the sub-region of the raw image corresponding to the first subgroup.

In the electronic device 101, the second image signal processor 2602 may receive a sub-region 802 of the raw image corresponding to the second subgroup from the image sensor 230 and may generate a second calibrated image 812 by calibrating the sub-region 802 of the raw image corresponding to the second subgroup with a delay of a preset time t1 after the first image signal processor 2601 receives the sub-region 801 of the raw image corresponding to the first subgroup from the image sensor 230.

In the electronic device 101, the third image signal processor 2603 may receive a sub-region 803 of the raw image corresponding to the third subgroup from the image sensor 230 and may generate a third calibrated image 813 by calibrating the sub-region 803 of the raw image corresponding to the third subgroup with a delay of a preset time t2 after the second image signal processor 2602 receives the sub-region 802 of the raw image corresponding to the second subgroup from the image sensor 230.

In the electronic device 101, the fourth image signal processor 2604 may receive a sub-region 804 of the raw image corresponding to the fourth subgroup from the image sensor 230 and may generate a fourth calibrated image 814 by calibrating the sub-region 804 of the raw image corresponding to the fourth subgroup with a delay of a preset time t3 after the third image signal processor 2603 receives the sub-region 803 of the raw image corresponding to the third subgroup from the image sensor 230. The delays of the preset times t1, t2, and t3 may be the same time interval. The electronic device 101 may generate an image 820 by separating the first calibrated image 811, the second calibrated image 812, the third calibrated image 813, and the fourth calibrated image 814 at an interval of a specified time and composing the same.

An electronic device 101 may include an image sensor 230, a memory 250, and a processor 120, wherein the processor 120 may be configured to: obtain a raw image using the image sensor 230; identify recognition information about a plurality of sub-regions corresponding to a plurality of objects included in the raw image, based on image recognition using the raw image; generate a first image by performing a first calibration process on the raw image using a first parameter set associated with first recognition information corresponding to a first sub-region among the plurality of sub-regions; generate a second image by performing a second calibration process on the raw image using a second parameter set associated with second recognition information corresponding to a second sub-region among the plurality of sub-regions; and generate a third image at least using a region of the first image corresponding to the first sub-region and a region of the second image corresponding to the second sub-region.

The processor 120 of the electronic device 101 may be configured to identify object information or scene information about the plurality of sub-regions as at least part of the recognition information.

The electronic device 101 may be configured to include a plurality of image signal processors (first to fourth image signal processors 2601, 2602, 2603, and 2604), to perform the first calibration process using a first image signal processor 2601 among the plurality of image signal processors (first to fourth image signal processors 2601, 2602, 2603, and 2604), and to perform the second calibration process using a second image signal processor 2602 among the plurality of image signal processors (first to fourth image signal processors 2601, 2602, 2603, and 2604).

The processor 120 of the electronic device may be configured to identify one or more sub-regions corresponding to recognition information satisfying a specified condition among the sub-regions, and to generate the third image using the identified one or more sub-regions obtained via the first calibration process or the second calibration process.

The electronic device 101 may further include at least two or more image signal processors (first to fourth image signal processors 2601, 2602, 2603, and 2604), wherein the processor 120 may be configured to: obtain the raw image using the image sensor 230; group sub-pixels of respective pixels corresponding to equivalent positions in the pixels in the image sensor; classify sub-pixels into subgroups corresponding to a number of image signal processors; generate at least two or more calibrated images by calibrating a sub-region of the raw image corresponding to a subgroup, and compose the at least two or more calibrated images.

The image sensor 230 of the electronic device 101 may include a pixel corresponding to one channel that includes four sub-pixels, the at least two or more image signal processors (first to fourth image signal processors 2601, 2602, 2603, and 2604) may include a first image signal processor 2601, a second image signal processor 2602, a third image signal processor 2603, and a fourth image signal processor 2604, the subgroups may include a first subgroup, a second subgroup, a third subgroup, and a fourth subgroup, and the processor 120 may be configured to calibrate a sub-region of the raw image corresponding to the first subgroup using the first image signal processor 2601, to calibrate a sub-region of the raw image corresponding to the second subgroup using the second image signal processor 2602, to calibrate a sub-region of the raw image corresponding to the third subgroup using the third image signal processor 2603, and to calibrate a sub-region of the raw image corresponding to the fourth subgroup using the fourth image signal processor 2604.

The electronic device 101 may compose the images calibrated by the first to fourth image signal processors (first to fourth image signal processors 2601, 2602, 2603, and 2604).

The electronic device 101 may further include at least two or more image signal processors (first to fourth image signal processors 2601, 2602, 2603, and 2604), wherein the processor 120 may be configured to: obtain the raw image using the image sensor 230; group sub-pixels of respective pixels corresponding to equivalent positions in the pixels in the image sensor 230; classify sub-pixels into a first subgroup corresponding to a first image signal processor 2601 and a second subgroup corresponding to a second image signal processor 2602; generate, using the first image signal processor 2601, a first calibrated image by receiving a sub-region of the raw image corresponding to the first subgroup from the image sensor 230 and calibrating the sub-region of the raw image corresponding to the first subgroup; generate, using the second image signal processor 2602, a second calibrated image by receiving a sub-region of the raw image corresponding to the second subgroup from the image sensor 230 and calibrating the sub-region of the raw image corresponding to the second subgroup with a delay of a preset time after the first image signal processor 2601 receives the sub-region of the raw image corresponding to the first subgroup from the image sensor 230; and generate an image by separating the first calibrated image and the second calibrated image at an interval of a specified time and composing the same.

The image sensor 230 of the electronic device 101 may include a pixel corresponding to one channel that includes four sub-pixels, the at least two or more image signal processors may further include a third image signal processor and a fourth image signal process, the subgroups may further include a third subgroup and a fourth subgroup, and the processor 120 may be configured to generate, using the third image signal processor, a third calibrated image by calibrating a sub-region of the raw image corresponding to the third subgroup with a delay of a preset time after the second image signal processor receives the sub-region of the raw image corresponding to the second subgroup from the image sensor, and to generate, using the fourth image signal processor, a fourth calibrated image by calibrating a sub-region of the raw image corresponding to the fourth subgroup with a delay of a preset time after the third image signal processor receives the sub-region of the raw image corresponding to the third subgroup from the image sensor.

The processor 120 of the electronic device 101 may be configured to generate an image by separating the first calibrated image to the fourth calibrated image at an interval of a specified time and composing the same.

An image processing method of an electronic device 101 including an image sensor 230 may include: obtaining a raw image using the image sensor 230; identifying recognition information about a plurality of sub-regions corresponding to a plurality of objects included in the raw image, based on image recognition using the raw image; generating a first image by performing a first calibration process on the raw image using a first parameter set associated with first recognition information corresponding to a first sub-region among the plurality of sub-regions; generating a second image by performing a second calibration process on the raw image using a second parameter set associated with second recognition information corresponding to a second sub-region among the plurality of sub-regions; and generating a third image at least using a region of the first image corresponding to the first sub-region and a region of the second image corresponding to the second sub-region.

The image processing method of the electronic device 101 including the image sensor 230 may further include identifying object information or scene information about the plurality of sub-regions as at least part of the recognition information.

In the image processing method of the electronic device 101 including the image sensor 230, the electronic device may include a plurality of image signal processors, and the method may include performing the first calibration process using a first image signal processor among the plurality of image signal processors and performing the second calibration process using a second image signal processor among the plurality of image signal processors.

The image processing method of the electronic device 101 including the image sensor 230 may further include: identifying one or more sub-regions corresponding to recognition information satisfying a specified condition among the sub-regions; and generating the third image using the identified one or more sub-regions obtained via the first calibration process or the second calibration process.

In the image processing method of the electronic device 101 including the image sensor 230, the electronic device may further include at least two or more image signal processors, and the method may include obtaining the raw image using the image sensor, grouping pixels having the same color filter in the image sensor, classifying sub-pixels into subgroups corresponding to a number of image signal processors, generating at least two or more calibrated images by calibrating a sub-region of the raw image corresponding to a subgroup, and composing the at least two or more calibrated images.

In the image processing method of the electronic device 101 including the image sensor 230, the image sensor may include a pixel corresponding to one channel that includes four sub-pixels, the at least two or more image signal processors may include a first image signal processor, a second image signal processor, a third image signal processor, and a fourth image signal process, the subgroups may include a first subgroup, a second subgroup, a third subgroup, and a fourth subgroup, and the method may include calibrating a sub-region of the raw image corresponding to the first subgroup using the first image signal processor, calibrating a sub-region of the raw image corresponding to the second subgroup using the second image signal processor, calibrating a sub-region of the raw image corresponding to the third subgroup using the third image signal processor, and calibrating a sub-region of the raw image corresponding to the fourth subgroup using the fourth image signal processor.

The image processing method of the electronic device 101 including the image sensor 230 may include composing the images calibrated by the first to fourth image signal processors.

In the image processing method of the electronic device 101 including the image sensor 230, the electronic device may further include at least two or more image signal processors, and the method may include: obtaining the raw image using the image sensor; grouping sub-pixels of respective pixels corresponding to equivalent positions in the pixels in the image sensor; classifying sub-pixels into a first subgroup corresponding to a first image signal processor and a second subgroup corresponding to a second image signal processor; generating, using the first image signal processor, a first calibrated image by receiving a sub-region of the raw image corresponding to the first subgroup from the image sensor and calibrating the sub-region of the raw image corresponding to the first subgroup; generating, using the second image signal processor, a second calibrated image by receiving a sub-region of the raw image corresponding to the second subgroup from the image sensor and calibrating the sub-region of the raw image corresponding to the second subgroup with a delay of a preset time after the first image signal processor receives the sub-region of the raw image corresponding to the first subgroup from the image sensor; and generating an image by separating the first calibrated image and the second calibrated image at an interval of a specified time and composing the same.

In the image processing method of the electronic device 101 including the image sensor 230, the image sensor may include a pixel corresponding to one channel that includes four sub-pixels, the at least two or more image signal processors may further include a third image signal processor and a fourth image signal process, the subgroups may further include a third subgroup and a fourth subgroup, and the method may further include: generating, using the third image signal processor, a third calibrated image by calibrating a sub-region of the raw image corresponding to the third subgroup with a delay of a preset time after the second image signal processor receives the sub-region of the raw image corresponding to the second subgroup from the image sensor; and generating, using the fourth image signal processor, a fourth calibrated image by calibrating a sub-region of the raw image corresponding to the fourth subgroup with a delay of a preset time after the third image signal processor receives the sub-region of the raw image corresponding to the third subgroup from the image sensor.

The image processing method of the electronic device 101 including the image sensor 230 may include generating an image by separating the first calibrated image to the fourth calibrated image at an interval of a specified time and composing the same.

An electronic device according to various embodiments disclosed herein may be various types of devices. The electronic devices may include, for example, a portable communication device (e.g., a smart phone), a computer device, a portable multimedia device, a portable medical device, a camera, a wearable device, or a home appliance. According to an embodiment, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," or "connected with,", it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the invoked at least one instruction. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more components of the above-described components or operations may be omitted, or one or more other components or operations may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
    an image sensor;
    a memory; and
    at least one processor configured to:
        obtain a raw image using the image sensor,
        based on image recognition using the raw image, identify recognition information of a plurality of sub-regions corresponding to a plurality of objects, respectively, included in the raw image,
        based on the image recognition and the recognition information, determine a type of object of each of the plurality of objects,
        based on the type of object of each of the plurality of objects, determine priorities of the plurality of objects, respectively, the priorities being determined among a plurality of priorities preset based on a number of image signal processors of the at least one processor,
        based on a first object in a first sub-region having a first priority among the priorities of the plurality of objects, generate a first image by performing a first calibration process on the raw image using a first parameter set associated with first recognition information corresponding to the first sub-region among the plurality of sub-regions, wherein a first image signal processor among a plurality of image signal processors performs the first calibration process,
        based on a second object in a second sub-region having a second priority lower than the first priority among the priorities of the plurality of objects, generate a second image by performing a second calibration process on the raw image using a second parameter set associated with second recognition information corresponding to the second sub-region among the plurality of sub-regions, wherein a second image signal processor among the plurality of image signal processors performs the second calibration process, and
        generate a third image by using a region of the first image corresponding to the first sub-region and a region of the second image corresponding to the second sub-region,
    wherein the first parameter set and the second parameter set include at least one image processing parameter among original color mapping, detail re-generation, text reconstruction, image inpainting, scene-based white balance (WB)/color adjustment, segmentation-based noise reduction (NR)/sharpening, or segmentation-based detail enhancement parameters.

2. The electronic device of claim 1, wherein the at least one processor is further configured to identify object information or scene information of the plurality of sub-regions as at least part of the recognition information.

3. The electronic device of claim 1, wherein the at least one processor is further configured to:
    identify sub-regions corresponding to recognition information satisfying a specified condition among the plurality of sub-regions, and
    generate the third image using the identified sub-regions corresponding to recognition information satisfying the specified condition.

4. The electronic device of claim 1, further comprising at least two or more image signal processors configured to:
    obtain the raw image using the image sensor,
    group sub-pixels of respective pixels corresponding to equivalent pixel positions in the image sensor,
    classify groups of sub-pixels into subgroups corresponding to the number of image signal processors,
    generate at least two or more calibrated images by calibrating each sub-region of the raw image corresponding to each subgroup, respectively, the at least two or more calibrated images comprising the first image and the second image, and
    compose the at least two or more calibrated images to generate the third image.

5. The electronic device of claim 4,
    wherein the image sensor comprises a pixel corresponding to one channel that comprises four sub-pixels,
    wherein the at least two or more image signal processors comprise the first image signal processor, a second image signal processor, a third image signal processor, and a fourth image signal processor,
    wherein the subgroups comprise a first subgroup, a second subgroup, a third subgroup, and a fourth subgroup, and
    wherein the at least one processor is further configured to:
        calibrate a sub-region of the raw image corresponding to the first subgroup using the first image signal processor,
        calibrate a sub-region of the raw image corresponding to the second subgroup using the second image signal processor,
        calibrate a sub-region of the raw image corresponding to the third subgroup using the third image signal processor, and
        calibrate a sub-region of the raw image corresponding to the fourth subgroup using the fourth image signal processor.

6. The electronic device of claim 5, wherein one or more images calibrated by the first to fourth image signal processors are composed.

7. The electronic device of claim 1, further comprising at least two or more image signal processors configured to:
    obtain the raw image using the image sensor;
    group sub-pixels of respective pixels corresponding to equivalent pixel positions in the image sensor;
    classify groups of sub-pixels into a first subgroup corresponding to the first image signal processor and a second subgroup corresponding to the second image signal processor;
    generate a first calibrated image corresponding to the first image by using the first image signal processor among the at least two or more image signal processors, the first calibrated image being generated by receiving a sub-region of the raw image corresponding to the first subgroup from the image sensor and calibrating the sub-region of the raw image corresponding to the first subgroup;
    generate a second calibrated image corresponding to the second image by using the second image signal processor among the at least two or more image signal processors, the second calibrated image being generated by receiving a sub-region of the raw image corresponding to the second subgroup from the image sensor and calibrating the sub-region of the raw image corresponding to the second subgroup with a delay of a preset time after the first image signal processor receives the sub-region of the raw image corresponding to the first subgroup from the image sensor; and generate an image corresponding the third image by separating the first calibrated image and the second calibrated image at an interval of a specified time and composing the first calibrated image and the second calibrated image.

8. The electronic device of claim 7, wherein the image sensor comprises a pixel corresponding to one channel that comprises four sub-pixels, wherein the at least two or more image signal processors comprise a third image signal processor and a fourth image signal processor, wherein groups of sub-pixels are further classified into a third subgroup and a fourth subgroup, and wherein the at least one processor is further configured to:
generate a third calibrated image by using the third image signal processor, the third calibrated image being generated by calibrating a sub-region of the raw image corresponding to the third subgroup with a delay of a preset time after the second image signal processor receives the sub-region of the raw image corresponding to the second subgroup from the image sensor, and generate a fourth calibrated image by using the fourth image signal processor, the fourth calibrated image being generated by calibrating a sub-region of the raw image corresponding to the fourth subgroup with a delay of a preset time after the third image signal processor receives the sub-region of the raw image corresponding to the third subgroup from the image sensor.

9. The electronic device of claim 8, wherein the at least one processor is further configured to generate an image corresponding to the third image by separating the first calibrated image, the second calibrated image, the third calibrated image, and the fourth calibrated image at an interval of a specified time and composing the first calibrated image, the second calibrated image, the third calibrated image, and the fourth calibrated image.

10. The electronic device of claim 1, wherein the at least one processor is further configured to:
based on the first priority being a preset first priority, generate the first image, and
based on the second priority being a preset second priority, generate the second image,
wherein the first object comprises one of a lawn, a person, a car, a letter, a natural object, or a sky, and
wherein the second object is different from the first object and comprises one of the lawn, the person, the car, the letter, the natural object, or the sky.

11. The electronic device of claim 1, wherein a number of the plurality of priorities preset correspond to the number of image signal processors of the at least one processor.

12. An image processing method of an electronic device comprising an image sensor, the method comprising:
obtaining a raw image using the image sensor;
based on image recognition using the raw image, identifying recognition information of a plurality of sub-regions corresponding to a plurality of objects, respectively, included in the raw image;
based on the image recognition and the recognition information, determining a type of object of each of the plurality of objects;

based on the type of object of each of the plurality of objects, determining priorities of the plurality of objects, respectively, the priorities being determined among a plurality of priorities preset based on a number of image signal processors of at least one processor of the electronic device;

based on a first object in a first sub-region having a first priority among the priorities of the plurality of objects, generating a first image by performing a first calibration process on the raw image using a first parameter set associated with first recognition information corresponding to the first sub-region among the plurality of sub-regions, wherein the first calibration process is performed by a first image signal processor among a plurality of image signal processors;

based on a second object in a second sub-region having a second priority lower than the first priority among the priorities of the plurality of objects, generating a second image by performing a second calibration process on the raw image using a second parameter set associated with second recognition information corresponding to a second sub-region among the plurality of sub-regions, wherein the second calibration process is performed by a second image signal processor among the plurality of image signal processors; and generating a third image by using a region of the first image corresponding to the first sub-region and a region of the second image corresponding to the second sub-region, wherein the first parameter set and the second parameter set include at least one image processing parameter among original color mapping, detail re-generation, text reconstruction, image inpainting, scene-based white balance (WB)/color adjustment, segmentation-based noise reduction (NR)/sharpening, or segmentation-based detail enhancement parameters.

13. The method of claim 12, further comprising identifying object information or scene information of the plurality of sub-regions as at least part of the recognition information.

14. The method of claim 12, further comprising:
identifying sub-regions corresponding to recognition information satisfying a specified condition among the plurality of sub-regions; and
generating the third image using the identified sub-regions corresponding to recognition information satisfying the specified condition.

15. The method of claim 12,
wherein the electronic device further comprises at least two or more image signal processors, and
wherein the method further comprises:
obtaining the raw image using the image sensor;
grouping sub-pixels of respective pixels corresponding to equivalent pixel positions in the image sensor;
classifying groups of sub-pixels into subgroups corresponding to the number of image signal processors;
generating at least two or more calibrated images by calibrating each sub-region of the raw image corresponding to each subgroup, respectively, the at least two or more calibrated images comprising the first image and the second image; and
composing the at least two or more calibrated images to generate the third image.

16. The method of claim 15,
wherein the image sensor comprises a pixel corresponding to one channel that comprises four sub-pixels, wherein the at least two or more image signal processors comprise the first image signal processor, a second image signal processor, a third image signal processor, and a fourth image signal processor, wherein the subgroups comprise a first subgroup, a second subgroup, a third subgroup, and a fourth subgroup, and wherein the method further comprises:
- calibrating a sub-region of the raw image corresponding to the first subgroup using the first image signal processor;
- calibrating a sub-region of the raw image corresponding to the second subgroup using the second image signal processor; calibrating a sub-region of the raw image corresponding to the third subgroup using the third image signal processor; and
- calibrating a sub-region of the raw image corresponding to the fourth subgroup using the fourth image signal processor.

17. The method of claim 16, further comprising composing one or more images calibrated by the first to fourth image signal processors.

18. The method of claim 12,
wherein the electronic device further comprises at least two or more image signal processors, and
wherein the method further comprises:
- obtaining the raw image using the image sensor;
- grouping sub-pixels of respective pixels corresponding to equivalent pixel positions in the image sensor;
- classifying groups of sub-pixels into a first subgroup corresponding to the first image signal processor and a second subgroup corresponding to the second image signal processor;
- generating a first calibrated image corresponding to the first image by using the first image signal processor, the first calibrated image being generated by receiving a sub-region of the raw image corresponding to the first subgroup from the image sensor and calibrating the sub-region of the raw image corresponding to the first subgroup;
- generating a second calibrated image corresponding to the second image by using the second image signal processor, the second calibrated image being generated by receiving a sub-region of the raw image corresponding to the second subgroup from the image sensor and calibrating the sub-region of the raw image corresponding to the second subgroup with a delay of a preset time after the first image signal processor receives the sub-region of the raw image corresponding to the first subgroup from the image sensor; and
- generating an image corresponding to the third image by separating the first calibrated image and the second calibrated image at an interval of a specified time and composing first calibrated image and the second calibrated image.

19. The method of claim 18,
wherein the image sensor comprises a pixel corresponding to one channel that comprises four sub-pixels,
wherein the at least two or more image signal processors further comprise a third image signal processor and a fourth image signal processor,
wherein groups of sub-pixels are further classified into a third subgroup and a fourth subgroup, and
wherein the method further comprises:
- generating a third calibrated image by using the third image signal processor, the third calibrated image being generated by calibrating a sub-region of the raw image corresponding to the third subgroup with a delay of a preset time after the second image signal processor receives the sub-region of the raw image corresponding to the second subgroup from the image sensor; and
- generating a fourth calibrated image by using the fourth image signal processor, the fourth calibrated image being generated by calibrating a sub-region of the raw image corresponding to the fourth subgroup with a delay of a preset time after the third image signal processor receives the sub-region of the raw image corresponding to the third subgroup from the image sensor.

20. The method of claim 19, further comprising:
generating an image corresponding to the third image by separating the first calibrated image, the second calibrated image, the third calibrated image, and the fourth calibrated image at an interval of a specified time and composing the first calibrated image, the second calibrated image, the third calibrated image, and the fourth calibrated image.

* * * * *